US008773742B2

(12) United States Patent
Suzuki

(10) Patent No.: US 8,773,742 B2
(45) Date of Patent: Jul. 8, 2014

(54) CONTROL DEVICE FOR GENERATING A FILE IN A FILE FORMAT INCLUDES STORED AND SCANNED PAGES WITH ELECTRONIC SIGNATURE

(75) Inventor: Nobuhiko Suzuki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 129 days.

(21) Appl. No.: 13/360,359

(22) Filed: Jan. 27, 2012

(65) Prior Publication Data
US 2012/0194882 A1 Aug. 2, 2012

(30) Foreign Application Priority Data
Jan. 27, 2011 (JP) ................ 2011-015733

(51) Int. Cl.
*H04N 1/46* (2006.01)
*H04N 1/00* (2006.01)
*G06F 3/12* (2006.01)
*G06K 15/00* (2006.01)

(52) U.S. Cl.
USPC ......... 358/540; 358/403; 358/1.15; 358/1.16; 358/537; 358/538

(58) Field of Classification Search
None
See application file for complete search history.

(56) References Cited

U.S. PATENT DOCUMENTS

| | | | |
|---|---|---|---|
| 2002/0114009 | A1 | 8/2002 | Stevens et al. |
| 2002/0140968 | A1 | 10/2002 | Kawabata et al. |
| 2003/0184803 | A1 | 10/2003 | Yamada et al. |
| 2006/0291005 | A1 | 12/2006 | Genda |
| 2007/0002392 | A1 | 1/2007 | Ogura |
| 2009/0303514 | A1* | 12/2009 | Puigardeu et al. ........... 358/1.13 |
| 2010/0039663 | A1 | 2/2010 | Ohsone |
| 2010/0231982 | A1 | 9/2010 | Mihira |

FOREIGN PATENT DOCUMENTS

| | | |
|---|---|---|
| EP | 0757311 A1 | 2/1997 |
| JP | 2000-224369 A | 8/2000 |
| JP | 2002-033879 A | 1/2002 |
| JP | 2002-290660 A | 10/2002 |
| JP | 2004-048349 A | 2/2004 |
| JP | 2005-176191 A | 6/2005 |
| JP | 2006-217212 A | 8/2006 |
| JP | 2007-013280 A | 1/2007 |

(Continued)

OTHER PUBLICATIONS

Machine translation in english of JP Pub 2010022046 to Yamaguchi Tetsuji.*
Japan Patent Office, Notification of Reasons for Rejection for Japanese Patent Application No. 2011-015733 (counterpart Japanese patent application), mailed Feb. 26, 2013.

(Continued)

*Primary Examiner* — Benny Q Tieu
*Assistant Examiner* — Haris Sabah
(74) *Attorney, Agent, or Firm* — Merchant & Gould P.C.

(57) ABSTRACT

A control device may comprise a selection allowing unit configured to allow a user to select a specific file among a plurality of files, each of the plurality of files having a file format that is capable of including a plurality of pages worth of data, the specific file including M pages worth of data, and a creating unit configured to create a first file that includes M+N pages worth of data by using N pages worth of scan data created by making a scan executing unit execute scanning of N pages worth of original and the M pages worth of data included in the specific file, the first file including M+N pages worth of data having a same file format as the specific file.

10 Claims, 9 Drawing Sheets

(56) References Cited

FOREIGN PATENT DOCUMENTS

| | | |
|---|---|---|
| JP | 2007-166114 A | 6/2007 |
| JP | 2010-022046 A | 1/2010 |
| JP | 2010-213236 A | 9/2010 |
| WO | 02-23884 A2 | 3/2002 |

OTHER PUBLICATIONS

European Patent Office, Extended European Search Report for European Patent Application No. 12152726.1 (corresponding to above-captioned patent application), mailed May 17, 2013.

European Office Action issued in EP 12 152 726.1, mailed May 14, 2014.

\* cited by examiner

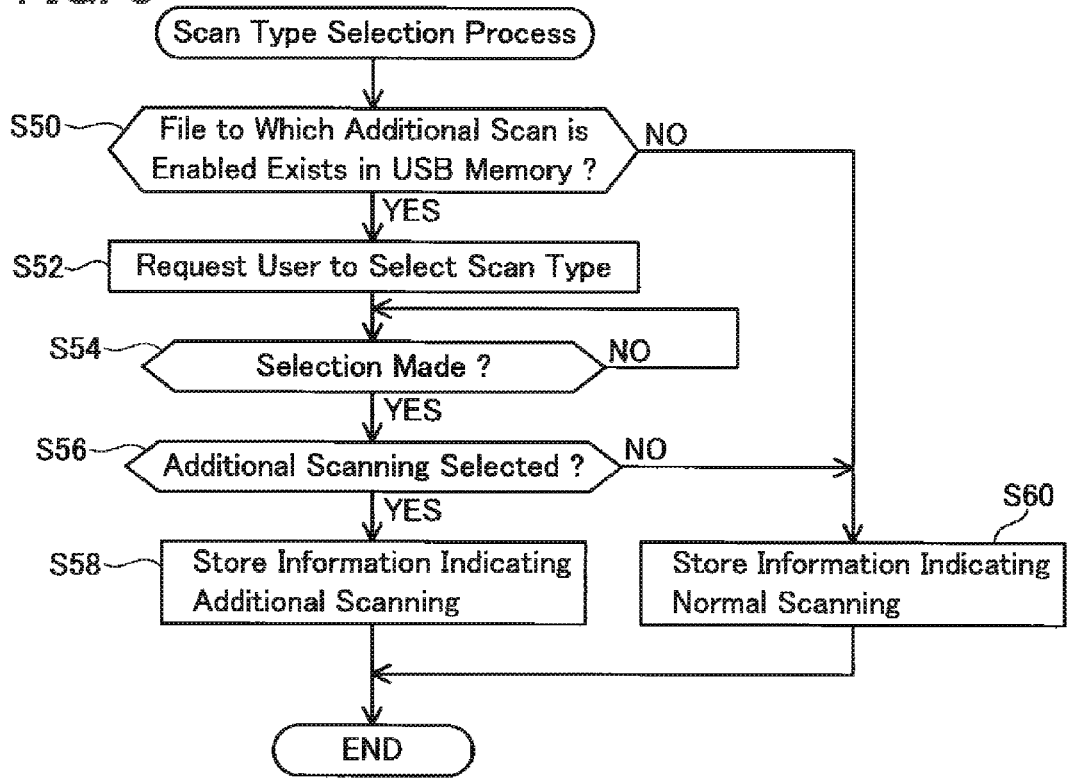
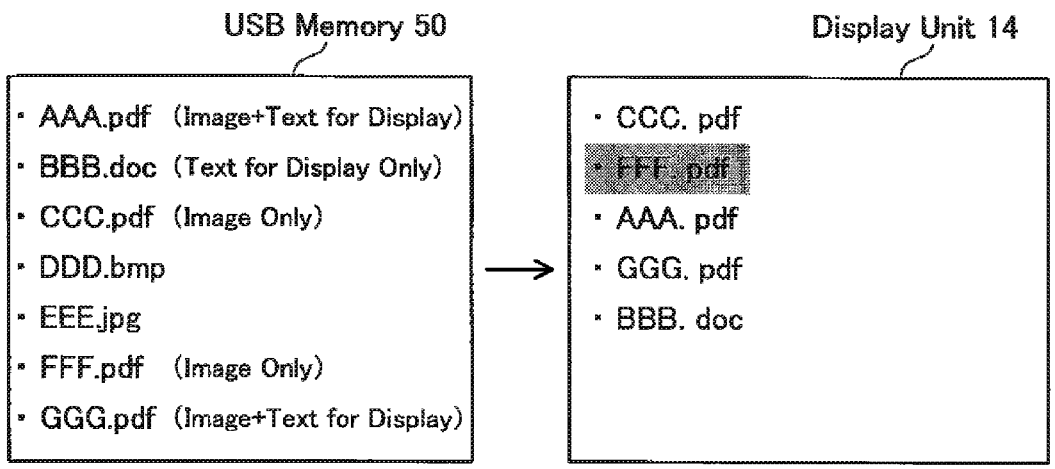

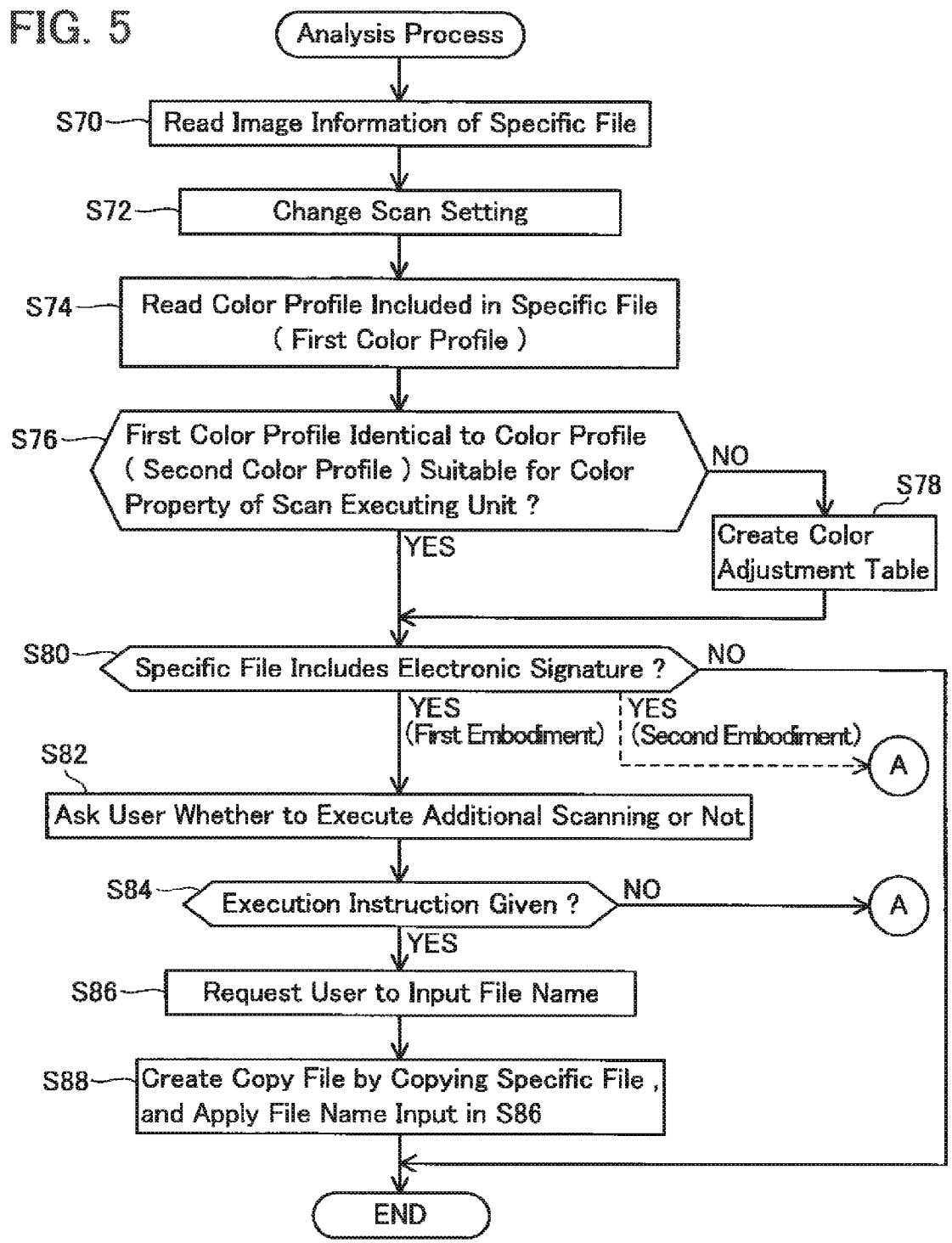

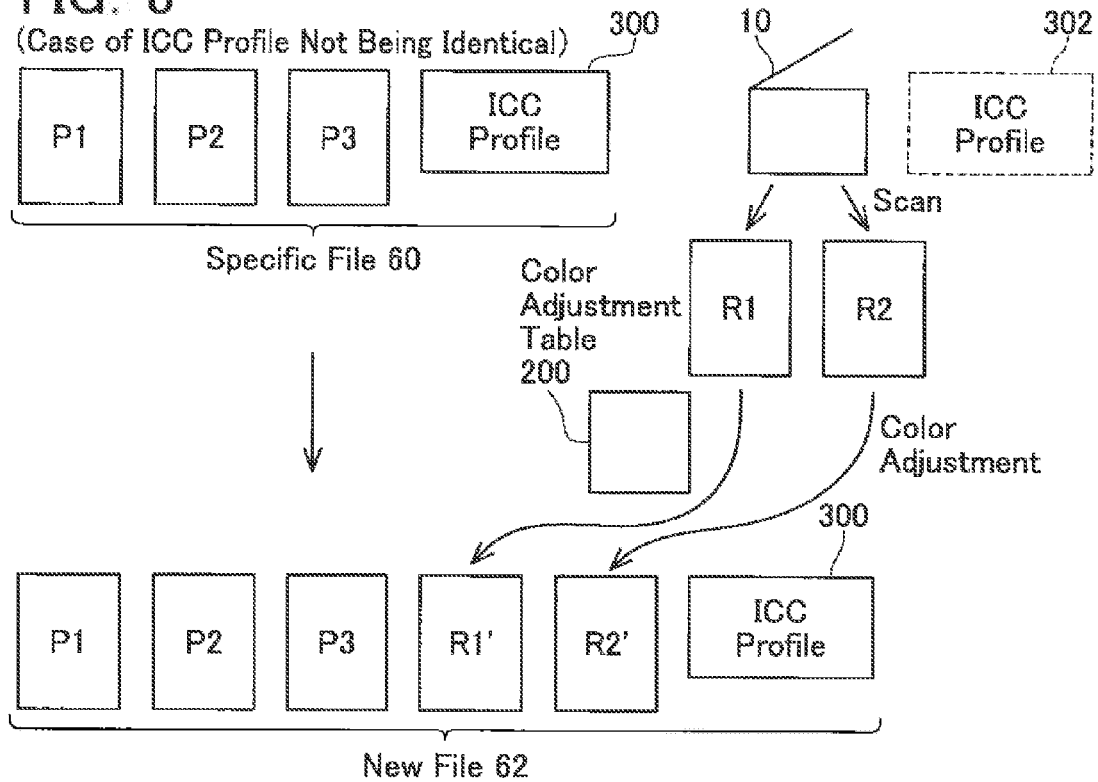
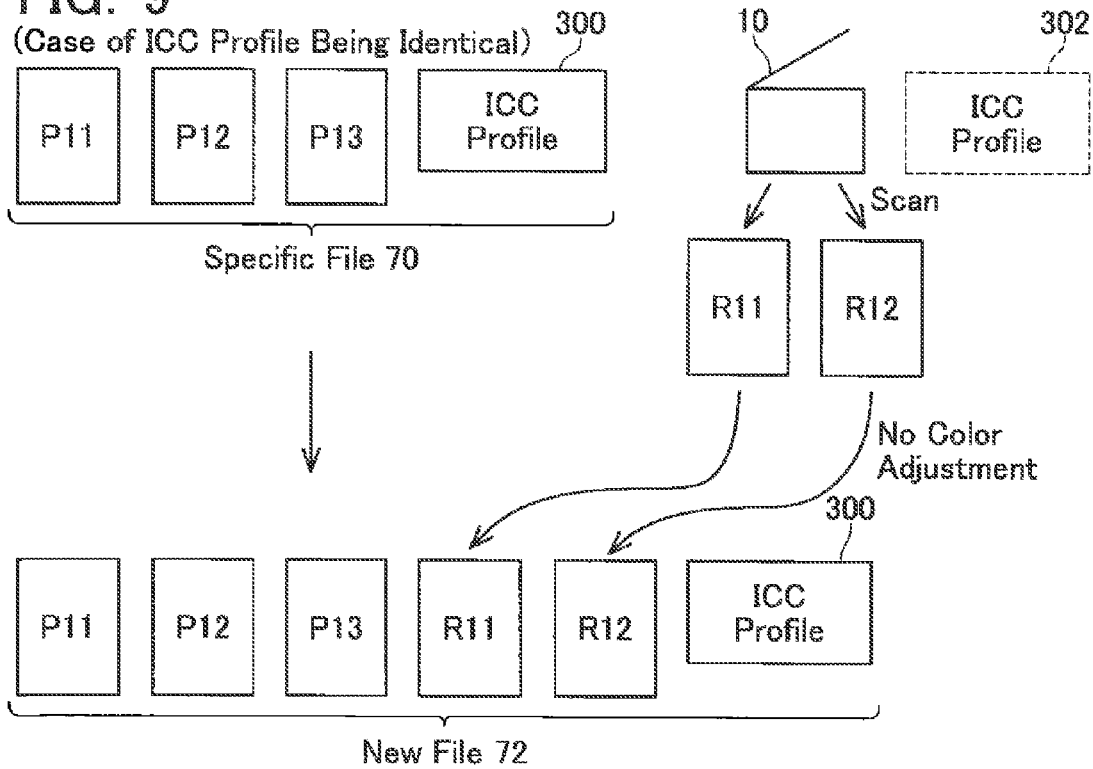

(Case of Electronic Signature Being Included)

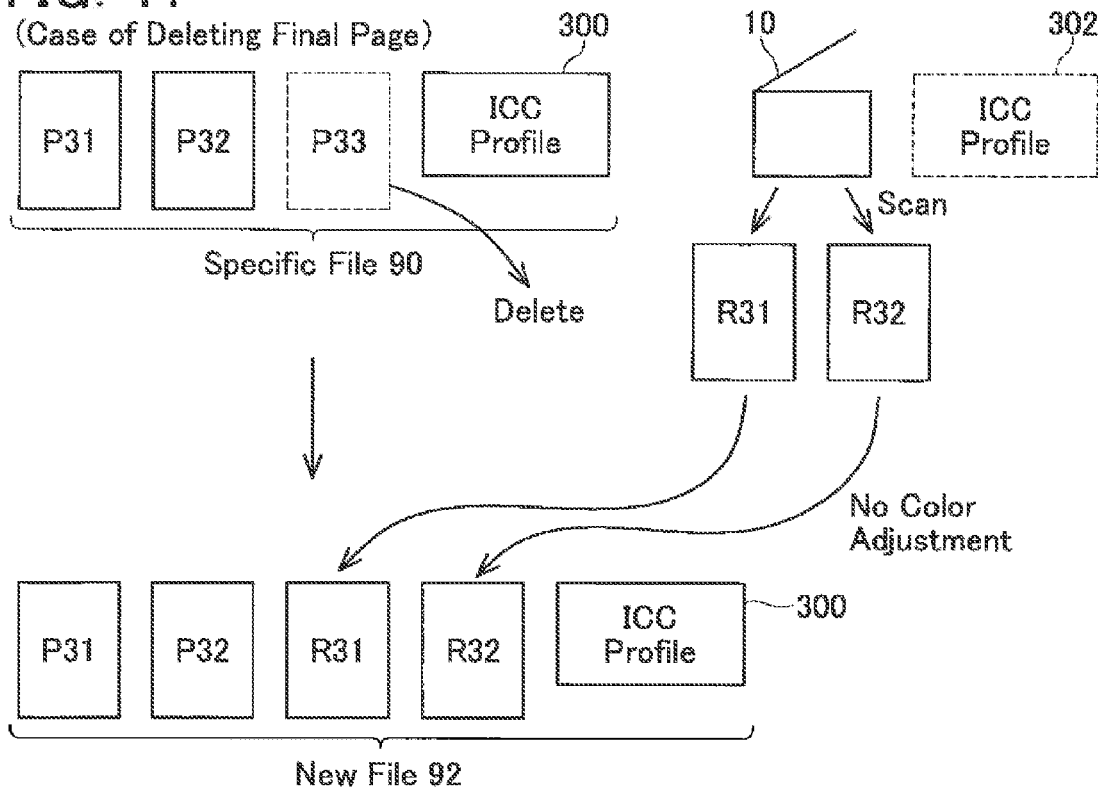
FIG. 11 (Case of Deleting Final Page)
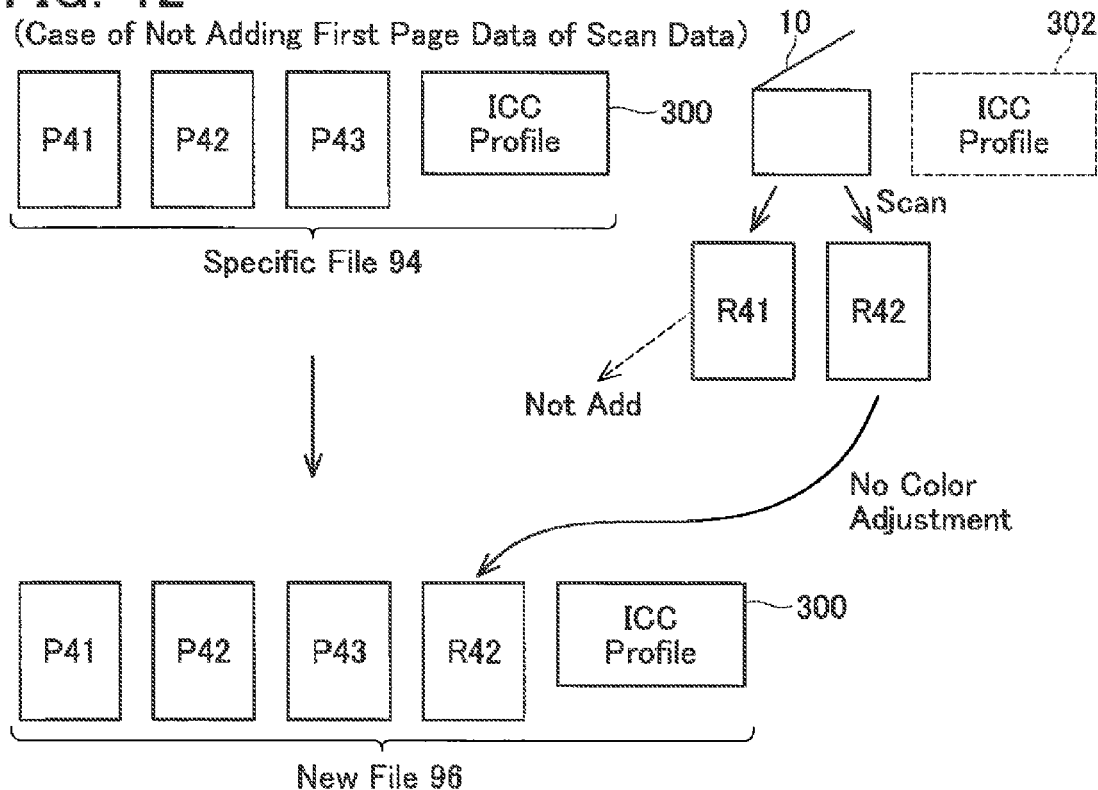
FIG. 12 (Case of Not Adding First Page Data of Scan Data)

CONTROL DEVICE FOR GENERATING A FILE IN A FILE FORMAT INCLUDES STORED AND SCANNED PAGES WITH ELECTRONIC SIGNATURE

CROSS-REFERENCE TO RELATED APPLICATIONS

This application claims priority to Japanese Patent Application No. 2011-15733, filed on Jan. 27, 2011, the contents of which are hereby incorporated by reference into the present application.

TECHNICAL FIELD

The present specification discloses a control device for controlling a scan executing unit that scans an original.

DESCRIPTION OF RELATED ART

For example, a system with a plurality of scanner devices is known. The plurality of scanner devices separately scans a plurality of pages worth of an original. One oldie plurality of scanner devices combines scan data created by the respective scanner devices, to create one file that includes the plurality of pages worth of the scan data.

SUMMARY

In the technology described above, it has a premise condition that the plurality of scanner devices scans the original substantially at the same time, and have each of the scan data created by the respective scanner devices combined. A new method for creating a file that includes data obtained by scanning is required.

The present specification provides a new technology that may respond to users' requests.

One aspect of techniques disclosed in the present specification is a control device for controlling a scan executing unit that scans an original. The control device may comprise one or more processors, and a memory that stores a computer program including instructions executed by the one or more processors. The instructions may cause the one or more processors, when executed by the one or more processors, to function as a selection allowing unit and a creating unit. The selection allowing unit may be configured to allow a user to select a specific file among a plurality of files, each of the plurality of files having a file format that is capable of including a plurality of pages worth of data, the specific file including M pages worth of data (M being an integer equal to 1 or more). The creating unit may be configured to create a first file including M+N pages worth of data by using N pages worth of scan data (N being an integer equal to 1 or more) created by making the scan executing unit execute scanning of the N pages worth of original and the M pages worth of data included in the specific file, the first file having a same file format as the specific file.

Note that a method for controlling this control device, a computer program, and a computer readable recording medium storing this computer program, are also novel and useful.

BRIEF DESCRIPTION OF DRAWINGS

FIG. 3 shows a flowchart of a scan type selection process;
FIG. 4 shows an example of contents stored in a USB memory and contents displayed on a display unit;
FIG. 5 shows a flowchart of an analysis process;
FIG. 8 shows an example of creating a new file (ICC profile not being identical);
FIG. 9 shows an example of creating a new file (ICC profile being identical);
FIG. 11 shows an example of creating a new file (a final page deleted);
and
FIG. 12 shows an example of creating a new file (a first page of scan data is skipped).

EMBODIMENT

First Embodiment (Configuration of System)

Figure 1:
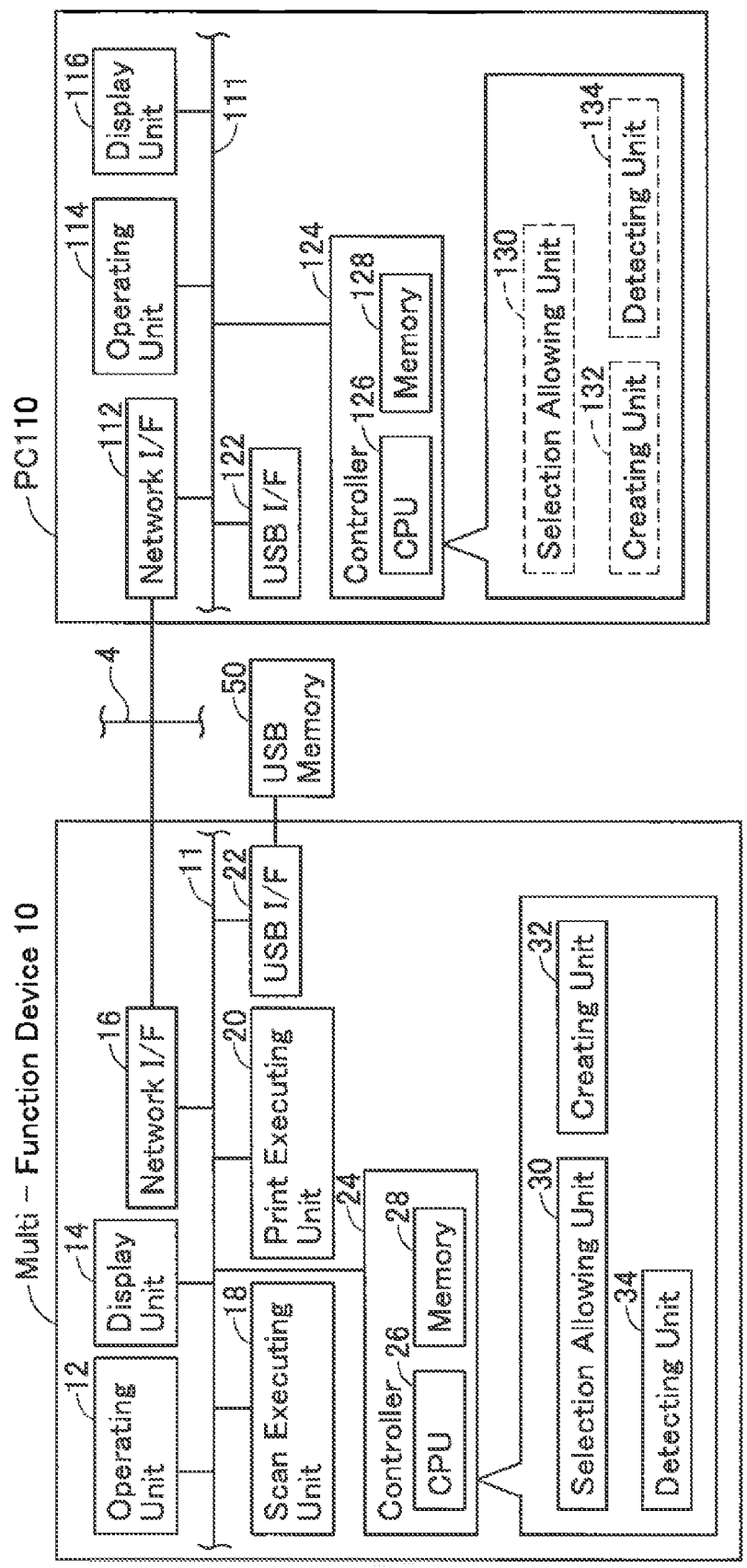
FIG. 1 shows a configuration of a communication system.

As shown in FIG. 1, a communication system 2 has a multi-function device 10 and a PC 110. The multi-function device 10 and the PC 110 are connected to a LAN 4. The multi-function device 10 and the PC 110 can communicate with each other through the LAN 4.

(Configuration of Multi-Function Device 10)

The multi-function device 10 is capable of executing multiple functions such as a scanning function, a print function and a copy function. The multi-function device 10 has an operating unit 12, a display unit 14, a network interface 16, a scan executing unit 18, a print executing unit 20, a USB interface 22, and a controller 24. These units 12 to 24 are connected to a bus 11.

The operating unit 12 is configured by a plurality of keys. A user can input various instructions to the multi-function device 10 by operating the operating unit 12. The display unit 14 is a display for displaying various information items. The network interface 16 is connected to the LAN 4. The scan executing unit 18 has a scanning mechanism, such as a CCD or CIS, and creates scan data (i.e., RGB image data) by scanning an original. The print executing unit 20 has a printing mechanism, such as a laser type printing mechanism or an ink jet type printing mechanism, and executes printing in response to an instruction from the controller 24. The USB interface 22 is an interface to which a USB memory 50 is connected.

The controller 24 has a CPU 26 and a memory 28. The memory 28 stores programs (not shown) therein. The CPU 26 executes various processes in accordance with the programs stored in the memory 28. Execution of the processes by the CPU 26 in accordance with the programs can realize the functions of units 30 to 34.

(Configuration of PC 110)

The PC 110 has a network interface 112, an operating unit 114, a display unit 116, a USB interface 122, and a controller 124. These units 112 to 124 are connected to a bus 111. The network interface 112 is connected to the LAN 4. The operating unit 114 is configured by a keyboard and a mouse. The user can input various instructions to the PC 110 by operating the operating unit 114. The display unit 116 is a display for displaying various information items. The USB interface 112 is an interface to which the USB memory 50 is connected.

The controller 124 has a CPU 126 and a memory 128. The memory 128 stores programs (not shown) therein. The programs include a printer driver and a scanner driver for the multi-function device 10. These drivers may be installed from a medium shipped along with the multi-function device 10, into the PC 110, or may be installed from a server provided by a vendor of the multi-function device 10, into the PC 110. The CPU 126 executes various processes in accordance with the programs stored in the memory 128. Execution of the processes by the CPU 126 in accordance with the scanner driver can realize the functions of units 130 to 134. The units 130 to 134 are used in a third embodiment that is described hereinafter.

(Processes Executed by Multi-Function Device 10)

Next, each of the processes executed by the controller 24 of the multi-function device 10 is described with reference to FIGS. 2 to 7.

Figure 2:
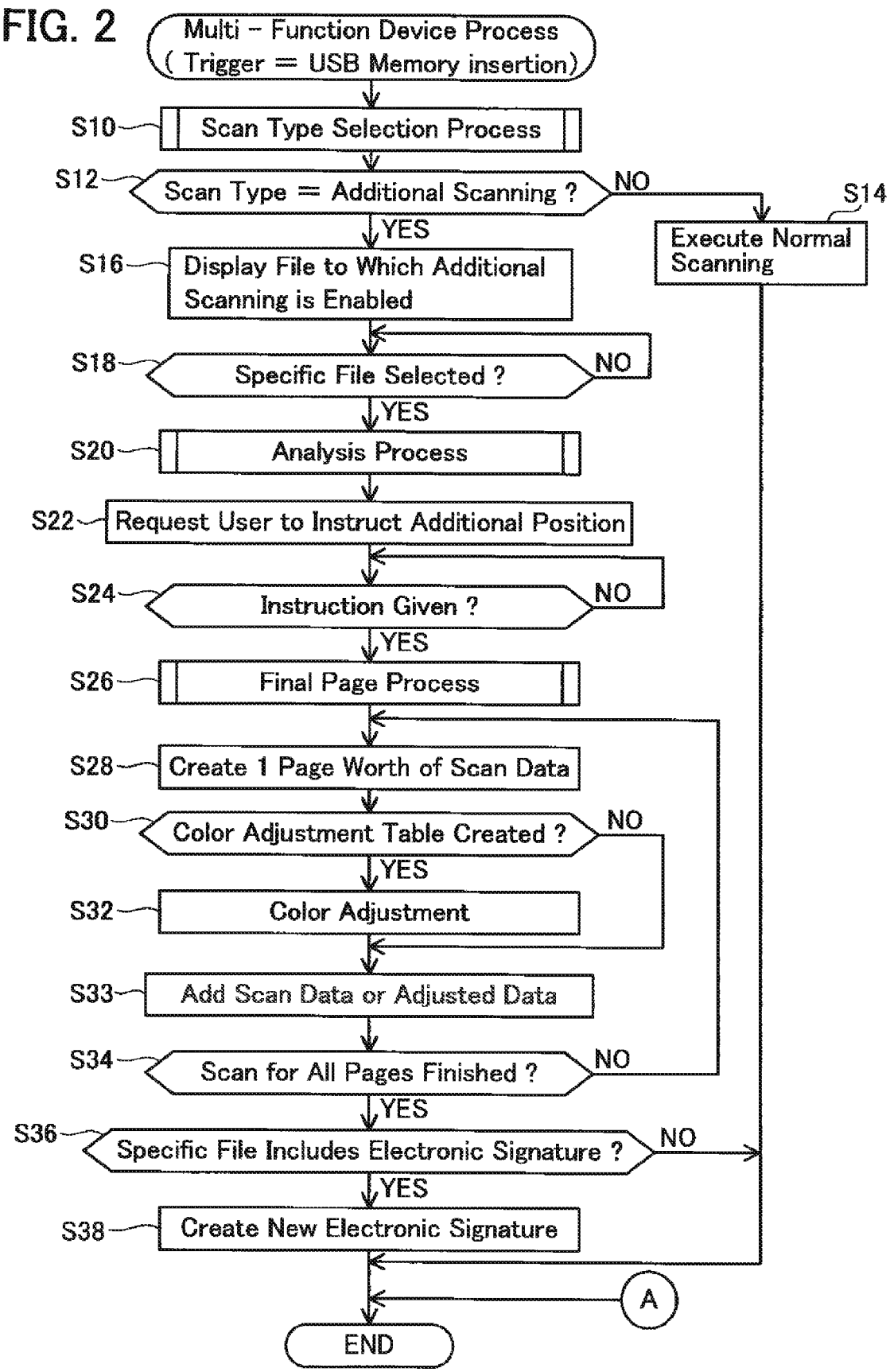
FIG. 2 shows a flowchart of a multi-function device process.

(Multi-Function Device Process: FIG. 2)

While the power of the multi-function device 10 is ON, a detecting unit 34 (see FIG. 1) monitors that the USB memory 50 is connected to the USB interface 22. The user can insert the USB memory 50 into the USB interface 22. In this case, the detecting unit 34 detects that the USB memory 50 is connected to the USB interface 22. In this case, the controller 24 starts a scan type selection process in S10 in FIG. 2. That is, the process of S10 in FIG. 2 is started with the USB memory 50 being connected to the USB interface 22 as a trigger thereof.

(Scan Type Selection Process: S10 in FIG. 2, FIG. 3)

The scan type selection process shown in FIG. 3 is a process for allowing the user to select a type of scanning executed by the multi-function device 10. The scan type includes normal scanning and additional scanning. The "additional scanning" is a process in which the scan executing unit 18 scans N pages worth of original (N being an integer equal to 1 or more) to create N pages worth of scan data, and a new file is created by using the N pages worth of scan data and M pages worth of data (M being an integer equal to 1 or more) included in an existing specific file. The "normal scanning" is a process in which a new file is created by using only the N pages worth of scan data that are created in the execution of the scanning as described above.

In S50, a selection allowing unit 30 determines whether a file on which the additional scanning is enabled exists in the USB memory 50 or not. The file on which the additional scanning is enabled is a file that has a file format that is capable of including a plurality of pages worth of data (i.e., a file format that has a concept of "pages"). More specifically, the file on which the additional scanning is enabled is, for example, a PDF file, an XPS file, a document file, and the like. On the other hand, a file on which the additional scanning is disabled is a file that has a file format that is not capable of including a plurality of pages worth of data (i.e., a file format that does not have the concept of "pages"). More specifically, the file on which the additional scanning is disabled is, for example, a JPEG file, a BMP file, and the like.

The selection allowing unit 30 determines "YES" in S50 when the USB memory 50 includes the file on which the additional scanning is enabled, and then proceeds to S52. However, the selection allowing unit 30 determines "NO" in S50 when the USB memory 50 does not include the file on which the additional scanning is enabled, and then proceeds to S60. In S60, the selection allowing unit 30 causes the memory 28 to store information indicating the normal scanning.

In S52, the selection allowing unit 30 requests the user to select the scan type. More specifically, the selection allowing unit 30 displays a predetermined message on the display unit 14 to request the user to select either the normal scanning or the additional scanning. Subsequently, the selection allowing unit 30 monitors that the selection is made by the user (S54). When the user causes the operating unit 12 to perform a selection operation (YES in S54), in S56 the selection allowing unit 30 determines whether the additional scanning is selected or not. When the additional scanning is selected (YES in S56), in S58 the selection allowing unit 30 causes the memory 28 to store information indicating the additional scanning. When the normal scanning is selected (NO in S56), the selection allowing unit 30 proceeds to S60. The scan type selection process is ended after S58 or S60 is ended.

(Continuation of Multi-Function Device Process: S12 and Subsequent Steps in FIG. 2)

Once the scan type selection process of S10 in FIG. 2 is ended, in S12 the selection allowing unit 30 determines whether the selected scan type is the additional scanning or not. When the information indicating the additional scanning is stored in the memory 28, the selection allowing unit 30 determines "YES" in S12 and proceeds to S16. On the other hand, when the information indicating the normal scanning is stored in the memory 28, the selection allowing unit 30 determines "NO" in S12 and proceeds to S14.

In S14, a creating unit 32 (see FIG. 1) executes the normal scanning. More specifically, the creating unit 32 causes the scan executing unit 18 to scan the N pages worth of original, and creates the N pages worth of scan data expressing N images (i.e., the N pages worth of original). Next, the creating unit 32 creates a new file that includes the N pages worth of scan data created in S14 and a color profile (i.e., an ICC profile) suitable for a color property of the scan executing unit 18. Accordingly, the multi-function device process is ended.

(Displaying Files on Which the Additional Scanning is Enabled: S16 in FIG. 2, FIG. 4)

In S16, the selection allowing unit 30 causes the display unit 14 to display a selection screen showing files on which the additional scanning is enabled, and requests the user to select one of the files. The process of S16 is described specifically with reference to FIG. 4. As shown on the left-hand side of FIG. 4, the USB memory 50 stores seven files. "AAA.pdf" to "GGG.pdf." On the other hand, as shown on the right-hand side of FIG. 4, in S16 the selection allowing unit 30 causes the display unit 14 to display a selection screen showing five files.

In S16 shown in FIG. 2, first, the selection allowing unit 30 specifies, from the USB memory 50, only files on which the additional scanning is enabled. In the example shown in FIG. 4, two files, "DDD.bmp" and "EEE.jpg" are files on which the additional scanning is disabled. Therefore, the selection allowing unit 30 specifies five files, "AAA.pdf," "BBB.pdf," "CCC.pdf," "FFF.pdf" and "GGG.pdf," as the files to be displayed by the display unit 14.

Next, in the specified five files, the selection allowing unit 30 distinguishes the files without text data for display from the files with text data for display. Here, the "text data for display" are text data used for displaying text (e.g., data with a combination of a language code and a character code). In the example shown in FIG. 4, the "CCC.pdf" and "FFF.pdf" denoted "image only" are files that include image data (i.e., bitmap data) but do not include text data. Furthermore, the "AAA.pdf" and "GGG.pdf" denoted "image+text for display" are files that include both the image data and text data for display. Note that the "BBB.doc" denoted "text for display only" is a file that includes the text data for display but does not include image data.

Next, the selection allowing unit 30 creates a selection screen in a manner that a group of files with text data for display and a group of files without text data are disposed separately. More specifically, the selection allowing unit 30 creates a selection screen in a manner that the group of files without text data for display is disposed above the group of files with text data for display. Furthermore, for the group files with text data for display, the selection allowing unit 30 creates a selection screen in a manner that the files with both image data and text data for display are displayed above the files that include text data for display but do not include image data. As a result, five files, "CCC.pdf," "FFF.pdf," "AAA.pdf," "GGG.pdf" and "BBB.doc," are displayed sequentially from the top in the display unit 14, as shown on the right-hand side of FIG. 4.

In the present embodiment, the files that have the file format incapable of including a plurality of pages worth of data ("DDD.bmp," "EEE.jpg") are not displayed on the display unit 14. That is, the user is prohibited from selecting these files. Specifically, in the present embodiment, the files that have the file format incapable of including a plurality of pages worth of data are not selected by the user. Thus, the multifunction device 10 can appropriately create a new file that includes M+N pages worth of data. Moreover, because the files are displayed in the order shown on the right-hand side of FIG. 4, the user can appropriately select the files disposed on the upper side, which are the files that include image data but do not include the text data for display. Here, it is highly likely that the files that include not the text data for display but image data are created as a result of scanning. For this configuration, it is highly likely that the files without the text data for display are files to which the user wishes to add the scan data, as compared to the files without the text data for display. Therefore, the selection allowing unit 30 creates a selection screen in a manner that the files without text data for display ("CCC.pdf" etc.) are disposed above the files with text data for display ("AAA.pdf" etc.). Therefore, the multi-function display 10 of the present embodiment can support a file selecting work executed by the user.

In addition, in the present embodiment, the selection screen described above is displayed on the display unit 14 at the timing when the USB memory 50 is connected to the USB interface 22 of the multi-function device 10. It is highly likely that the timing when the USB memory 50 is connected to the interface 22 is the timing when the user wishes to scan the original to create a file. Therefore, the multi-function device 10 of the present embodiment causes the display unit 14 to display the selection screen at an appropriate timing.

(Continuation of Multi-Function Device Process: S18 and Subsequent Steps in FIG. 2)

Subsequently, in S18 shown in FIG. 2, the selection allowing unit 30 monitors that the user selects one file (referred to as "specific file" hereinafter) from the plurality of files displayed on the display unit 14. When the user operates the operating unit 12 to select the specific file from the plurality of files, the selection allowing unit 30 determines "YES" in S18 and proceeds to S20.

(Analysis Process: S20 in FIG. 2, FIG. 5)

An analysis process shown in FIG. 5 is a process for analyzing various image information items described in the specific file. In S70 the creating unit 32 reads the various image information items described in the specific file. The various image information items include the resolution, the number of colors (black and white, 256 color gradations, etc.) and the like of the specific file. Next, in S72 the creating unit 32 changes various settings used by the scan executing unit 18, based on the various image information items read in S70. Specifically, the creating unit 32 changes the resolution, the number of colors and the like used by the scan executing unit 18, to contents identical to the various image information items read in S70. As a result, in a process of S28 shown in FIG. 2 as after mentioned, the scanning is executed based on the various settings that are made in accordance with the various image information items read in S70.

Subsequently, in S74 the creating unit 32 reads a color profile (referred to as "first color profile" hereinafter) that is included in the specific file. In S76 the creating unit 32 determines whether or not the first color profile is identical to the color profile suitable for the color property of the scan executing unit 18 (referred to as "second color profile" hereinafter).

When the first color profile is identical to the second color profile (YES in S76), the creating unit 32 proceeds to S80. However, when the first color profile is not identical to the second color profile (NO in S76), in S78 the creating unit 32 creates a color adjustment table. Here, the first color profile and the second color profile are each a profile for transforming a pixel value within a first color space (a RGB color space, in the present embodiment) into a pixel value of a second color space (an XYZ color space, in the present embodiment).

The scan executing unit 18 of the multifunction device 10 creates the N pages worth of scan data on the basis of the fact that color transformation is performed thereon using the second color profile. When the N pages worth of scan data are added to the specific file, the added N pages worth of scan data are also transformed by using the first color profile, as with the existing M pages worth of data. Therefore, when the first color profile is not identical to the second color profile, color transformation is not executed properly on the N pages worth of scan data. That is, it is likely that the color of an image that is expressed by the data obtained as a result of the color transformation on the N pages worth of scan data becomes different from the actual color of the original to be scanned. For this configuration, when the first color profile is not identical to the second color profile, the creating unit 32 creates the color adjustment table in S78 so that the actual color of the original is expressed properly.

(Creating Color Adjustment Table: S78 in FIG. 5, FIG. 6)

Figure 6:
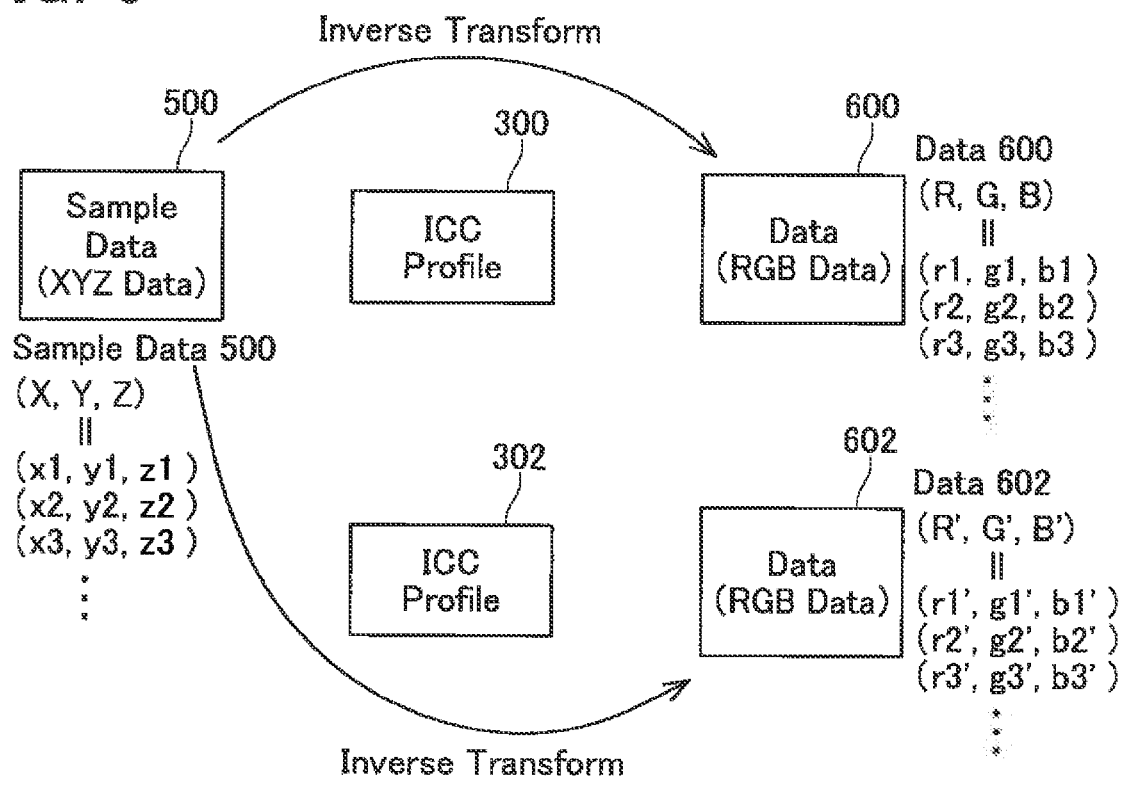
FIG. 6 shows an example of creating a color adjustment table.

The process of S78 is described specifically with reference to FIG. 6. In an example shown in FIG. 6, a first color profile 300 included in the specific file is not identical to a second color profile 302 suitable for the color property of the scan executing unit 18.

The creating unit 32 executes inverse transform that inversely transforms sample data 500 including a plurality of XYZ pixels (x1, y1, z1) and the like by using the first color profile 300, and creates data 600 that include a plurality of RGB pixels (r1, g1, b1) and the like. Furthermore, the creating unit 32 executes inverse transform that inversely transforms the sample data 500 by using the second color profile 302, and creates data 602 that include a plurality of RGB pixels (r1', g1', b1') and the like.

Then, the creating unit 32 writes, for each of the plurality of pixels of the data 602, the value (r1', g1', b1') and the like as the input value of the color adjustment table 200. Moreover, the creating unit 32 calculates differences between the data 600 and the data 602, and writes the obtained differences (r1−r1', g1−g1', b1−b1') as adjusted values of the color adjustment table 200. As a result, the color adjustment table 200 is completed. The creating unit 32 stores this color adjustment table 200 in the memory 28.

As is clear form the above description, the color adjustment table 200 has data ((r1, g1, b1)−(r1', g1', b1')) for approximating the pixels value of the second color space (1', g1', b1') that are obtained from the predetermined pixel values of the second color space (i.e., the XYZ pixel values included in the sample data 500) as a result of the inverse transformation using the second color profile 302, to the pixel values of the first color space (r1, g1, b1) that are obtained from the predetermined pixel values of the first color space as a result of the inverse transformation using the first color profile 300.

(Continuation of Analysis Process: S80 and Subsequent Steps in FIG. 5)

In S80, the creating unit 32 determines whether the specific file includes an electronic signature or not. When the specific file does not include an electronic signature (NO in S80), S82 to S88 are skipped, and the analysis process is ended. In this case, the creating unit 32 stores, in the memory 28, information indicating that the specific file does not include an electronic signature.

On the other hand, when the specific file includes an electronic signature (YES in S80), in S82 the creating unit 32 causes the display unit 14 to display a predetermined message, and inquires the user whether the additional scanning can be executed or not. Note, in this case, that the creating unit 32 stores, in the memory 28, information indicating that the specific files includes an electronic signature. Note that the "electronic signature" includes not only a signature value that is created by encrypting hash values of the data included in the file, but also a time stamp that is created by providing electronic data with time/date information.

Subsequently, S84 determines whether or not the user instructs the execution of the additional scanning. The user can operate the operating unit 12 to select to execute or not to execute the additional scanning. When the user selects to execute the additional scanning, the creating unit 32 determines "YES" in S84 and proceeds to S86. However, when the user selects not to execute the additional scanning, the creating unit 32 determines "NO" in S84 and ends the multi-function device process shown in FIG. 2.

In S86 the creating unit 32 requests the user to input a file name. More specifically, the creating unit 32 causes the display unit 14 to display a predetermined message and an entry field and requests the user to input a file name. Next, in S88 the creating unit 32 copies the specific tile to create a copy file within the USB memory 50, and adds the file name input in S86, to the copy file. When the user does not input a file name in S86, the creating unit 32 automatically determines the file name and adds this file name to the copy file. When the specific file includes the electronic signature, the data included in the specific file are likely to be important data for the user. According to the present embodiment, when the specific file includes the electronic signature (YES in S80), the specific file is maintained without any change. Therefore, the important data are maintained without any change. Once S88 is ended, the analysis process is ended. When the copy file is created in S88, the created copy file is redefined as a new specific file, and subsequent processes are executed. The specific file to be copied is kept as a backup file. That is, the scan data are added to the copy file. According to this configuration, the specific file to be copied is maintained without having the contents and the name of the file changed.

(Continuation of Multi-Function Device Process: S22 and Subsequent Steps in FIG. 2)

Once the analysis process (S20 in FIG. 2) is ended, in S22 the creating unit 32 requests the user to input on an additional position of the scan data. More specifically, the creating unit 32 causes the display unit 14 to display M thumbnail images expressed by the M pages worth of data included in the specific file, and requests the user to input the additional position. The user operates the operating unit 12 and inputs a position to add the scan data to, in the M images (i.e., before or after a certain page).

In S24, the creating unit 32 monitors that the user inputs the additional position. When the additional position is input (YES in S24), the creating unit 32 stores information indicating the additional position, in the memory 28, and then proceeds to S26. In S26 the creating unit 32 executes a final page process (see FIG. 7).

(Final Page Process: S26 in FIG. 2, FIG. 7)

Figure 7:
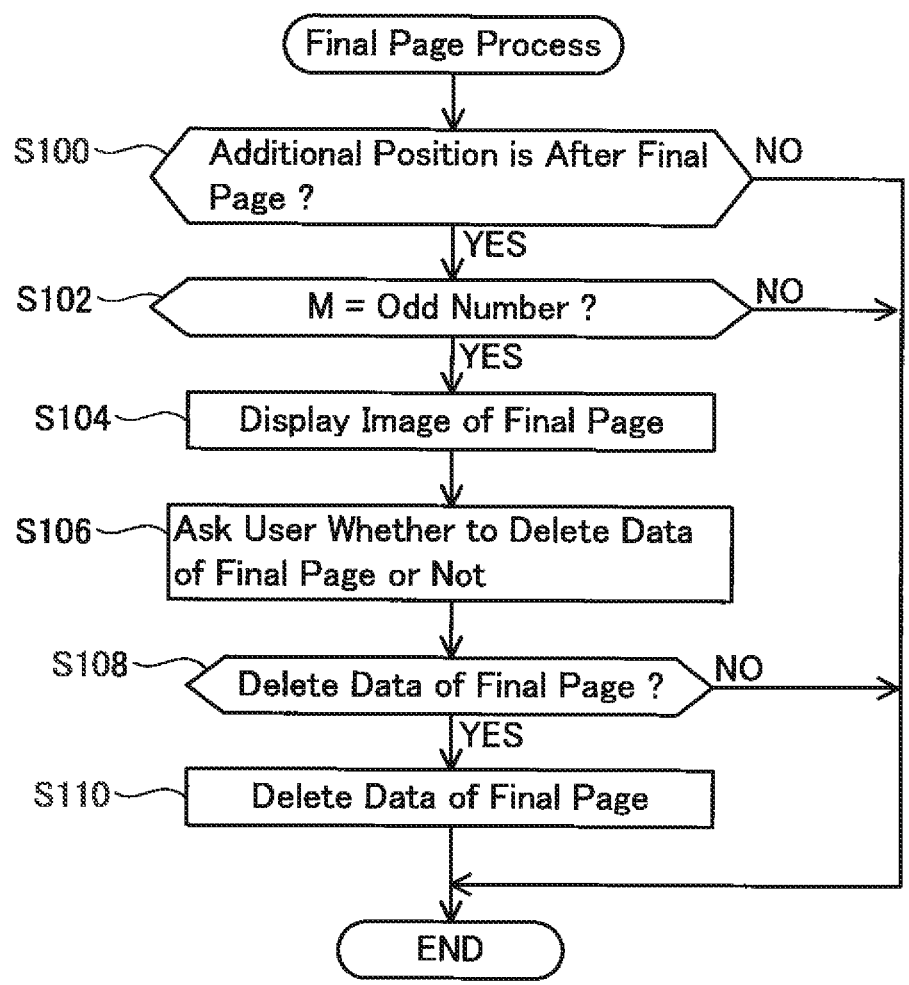
FIG. 7 shows a flowchart of a final page process.

A final page process shown in FIG. 7 is a process for deleting data on a final page (M-th page) of the specific file. In S100, the creating unit 32 determines whether the additional position input by the user is located after the final page or not. When the additional position is after the final page (YES in S100), in S102 the creating unit 32 determines whether the total number of pages (i.e., M) of the data included in the specific file is an odd number or not.

For example, when both-side scanning is executed, there is a possibility that the user cancels scanning of a reverse side of a specific original after scanning a front side of the specific original. When the specific file is created as a result of such scanning, the number of pages (i.e., M) of the data included in the specific file is an odd number. In this situation, there is a possibility that the user executes the both-side scanning on the specific original again and then wishes to add data expressing the reverse side of the specific original to the specific file. However, the specific file already includes data expressing the front side of the specific original. Therefore, when the both-side scanning is executed on the specific original, the data on the final page (the M-th page) included in the specific file (the data expressing the front side of the specific original) overlap with scan data on the first page created as a result of the both-side scanning of the specific original. In such a situation, therefore, the data on the final page (the M-th page) included in the specific file need to be deleted.

When the total number of pages (i.e., M) of the data included in the specific file is an odd number (YES in S102), in S104 the creating unit 32 causes the display unit 14 to display a thumbnail image that is expressed by the data of the final page (the M-th page) included in the specific file. Subsequently, in S106 the creating unit 32 inquires of the user whether the data of the final page can be deleted or not. The user operates the operating unit 12 and selects whether to delete the data of the final page. When the user selects to delete the final page (YES in S108), in S110 the creating unit 32 deletes the data of the final page from the specific file. In this case, the specific file includes M−1 pages worth of data. The final page process is ended after S110 is ended.

Note that when the additional position stored in the memory 28 is not located after the final page (NO in S100), or when the total number of pages of the data included in the specific file is an even number (NO in S102), or when the user selects not to delete the data of the final page (NO in S108), the creating unit 32 ends the final page process without deleting the data of the final page from the specific file.

(Continuation of Multi-Function Device Process: S28 and Subsequent Steps in FIG. 2)

Once the final page process (S26 in FIG. 2) is ended, in S28 the creating unit 32 causes the scan executing unit 18 to create the scan data. More specifically, the creating unit 32 controls the scan executing unit 18 and causes the scan executing unit 18 to scan the first page of the original, and thereby creates the scan data of the first page (RGB data). Next, in S30 the creating unit 32 determines whether the color adjustment table is created or not. In the process of S78 shown in FIG. 5, when the color adjustment table 200 (see FIG. 5) is stored in the memory 28, the creating unit 32 determines "YES" in S30 and proceeds to S32. However, when the color adjustment table 200 is not stored in the memory 28, the creating unit 32 determines "NO" in S30, skips S32, and proceeds to S34.

In S32 the creating unit 32 executes color adjustment on the scan data by using the color adjustment table 200. A color adjustment process performed in S32 is described specifically with reference to FIG. 6.

For instance, when a value of a pixel included in the scan data matches any of the input values (e.g., (r1', g1', b1')) included in the color adjustment table 200, the creating unit 32 adds an adjusted value (e.g., (r1'-r1, g1'-g1, b1'-b1)) corresponding to the input value, to the value of the pixel, thereby obtains a value of an adjusted pixel.

However, there is a possibility that the value of the pixel included in the scan data does not match any of the input values included in the color adjustment table 200. In this case, the creating unit 32 performs an interpolation process using any of the input values close to the value of the pixel, thereby obtaining the value of the adjusted pixel.

In S32 the creating unit 32 calculates a value of an adjusted pixel for each of a plurality of pixels of 1 page worth of scan data. Consequently, 1 page worth of adjusted data is created. As a result, when executing the color transformation on the 1 page worth of adjusted data by using the first color profile 300 included in the specific file, color-transformed data that appropriately express the colors of the original are created.

In S33 executed through S32, the creating unit 32 adds the 1 page worth of adjusted data created in S32 to the specific file. An additional position of the adjusted data is the position input by the user in S24. However, in S33 executed without going through S32 (in S33 executed when the result of S30 is NO), the creating unit 32 adds the 1 page worth of scan data created in S28 to the specific file. An additional position of the scan data is the position input by the user in S24. The creating unit 32 proceeds to S34 after S33 is ended.

In S34 the creating unit 32 determines whether the scan executing unit 18 has scanned all of the N pages worth of original or not. When all of the pages are not entirely scanned (NO in S34), the creating unit 32 repeats the processes of S28 to S33. In this case, in S33 the creating unit 32 adds new 1 page worth of data (1 page worth of adjusted data or 1 page worth of scan data) to a position located after the 1 page worth of data (1 page worth of adjusted data or 1 page worth of scan data) that is added in the previous process of S33.

As is clear form the above description, when, for example, the additional position input by the user is located after an M1 page (M1 being an integer equal to or greater than 1 but equal to or less than M), the 1 page worth of data that is added in S33 is added to the specific file as data of an (M1+1)-th page. When further scanning is executed, data of an (M1+2)-th page, (M1+3)-th page and the like are added to the specific file. Moreover, when the additional position input by the user is located after the final page (M-th page) and the final page of the specific file is deleted (see S110 in FIG. 7), the 1 page worth of data that is added in S33 is added to the specific file as data of the M-th page.

Note that when the copy file is created (S88 in FIG. 5), no data are added to the specific file to be copied (that is, the specific file to be copied is kept). Therefore, the data important to the user are maintained without any change.

When scanning of the whole pages is ended (YES in S34), a new file is obtained. The new tile is obtained by adding the N pages worth of data (adjusted data or scan data) to the specific file. For instance, in a first example in which the data of the final page (the data of the M-th page) are not deleted in S110 shown in FIG. 7, the new file includes the M pages worth of eta, the N pages worth of data, and the first color profile 300. That is, the new file includes the M+N pages worth of data and the first color profile 300.

Furthermore, in a second example in which the data of the final page (the data of the M-th page) are deleted in S110 shown in FIG. 7, the specific file includes the M−1 pages worth of data the N pages worth of data, and the first color profile 300. That is, the specific file includes M+N−1 pages worth of data and the first color profile 300. According to this configuration, the new tile can be prevented from including two pages worth of data, the two pages being the same pages.

In either the first or second example described above, the new file has the same file format as the specific file. That is, an extension of the new file (e.g., ".pdf") is the same extension as that of the specific file. Moreover, the new file normally has a file name same as that of the specific file selected in S18. However, when the copy file is created in S88 of FIG. 5 and the file name that had been input in S86 is input to the copy file (the file name different from that of the specific file that had been copied), the new file has the file name input in S86.

In S36 the creating unit 32 determines whether the specific file includes an electronic signature or not. More specifically, the creating unit 32 determines whether the memory 28 stores information indicating that the specific file includes the electronic signature or not. When the specific file includes the electronic signature (YES in S36), in S38 the creating unit 32 calculates hash values of the data included in the specific file (M+N pages worth of data or M+N−1 pages worth of data), and creates a new electronic signature. The creating unit 32 then adds the new electronic signature to the new file. As a result, a new file with an electronic signature is completed. For this configuration, when the data included in the new file are falsified, the user can know the falsification.

When the specific file does not include the electronic signature (NO in S36), S38 is skipped, and the multi-function device process of FIG. 2 is ended.

Specific Example

FIGS. 8 to 11

Subsequently, a specific example of creating the new file by means of the multi-function device process executed by the multi-function device 10 of the present embodiment (see FIG. 2) is described with reference to FIGS. 8 to 11.

(Specific Example where ICC Profile is not Identical: FIG. 8)

FIG. 8 shows an example in which the first color profile 300 is not identical to the second color profile 302 (NO in S76 of FIG. 5). Note that, in the example shown in FIG. 8, a specific file 60 does not include an electronic signature (NO in S80 of FIG. 5, and NO in S36 of FIG. 2), and the user does not instruct to delete the final page (NO in S108 of FIG. 7).

As shown in FIG. 8, the specific file 60 selected by the user includes three pages worth of data P1 to P3 and the first color profile 300. Because the first color profile 300 is not identical to the second color profile 302, the creating unit 32 executes the color adjusting process on two pages worth of scan data R1, R2 by using the color adjustment table 200 (S32 in FIG. 2). As a result, two pages worth of adjusted data R1', R2' are created. In the example shown in FIG. 8, the creating unit 32 adds the two pages worth of adjusted data R1', R2' to the back of the data P3 of the third page (the final page) of the specific file 60. As a result, a new file 62 that includes the three pages worth of data P1 to P3, the two pages worth of adjusted data R1', R2', and the first color profile 300 is created.

(Specific Example where ICC Profile is Identical: FIG. 9)

FIG. 9 shows an example in which the first color profile 300 is identical to the second color profile 302 (YES in S76 of FIG. 5). As with the example shown in FIG. 8, in the example shown in FIG. 9, a specific file 70 does not include an electronic signature, and the user does not instruct to delete the final page.

The creating unit 32 does not execute the color adjustment process on two pages worth of scan data R11, R12. The creating unit 32 adds the two pages worth of scan data R11, R12 to the back of data P13 of the third page of the specific file 70. As a result, a new file 72 that includes three pages worth of data P11 to P13, the two pages worth of scan data R11, R12, and the first color profile 300 is created.

Figure 10:
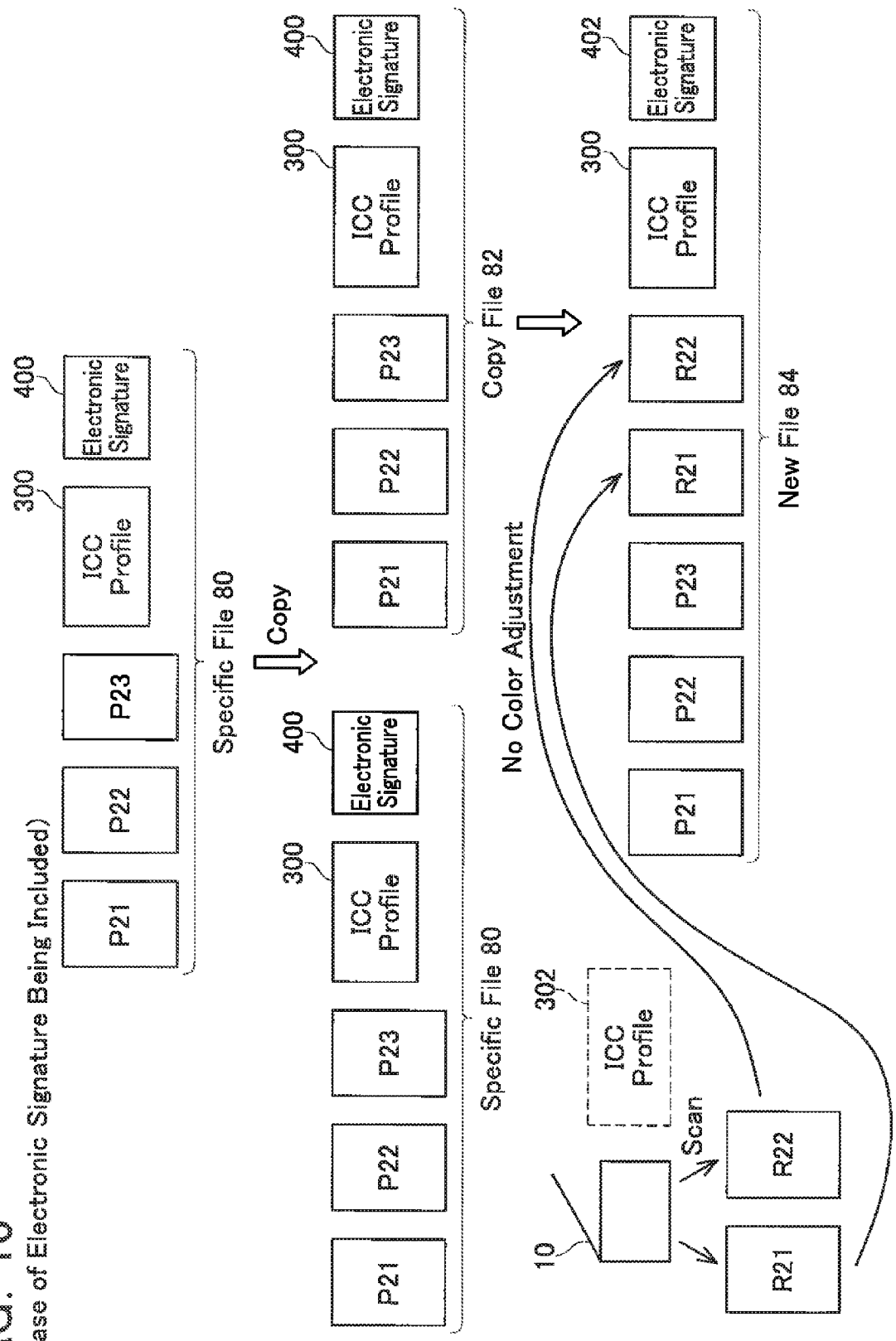
FIG. 10 shows an example of creating a new file (an electronic signature included)

(Specific Example where Electronic Signature is Included: FIG. 10)

FIG. 10 shows an example in which a specific file 80 includes an electronic signature 400 (YES in S80 of FIG. 5, and YES in S36 of FIG. 2). As with the example shown in FIG. 9, the example shown in FIG. 10, the first color profile 300 is identical to the second color profile 302. Moreover, the user has not instruct to delete the final page.

Because the specific file 80 includes the electronic signature 400, the creating unit 32 copies the specific file 80 and creates a copy file 82 (S88 of FIG. 5). The creating unit 32 then adds two pages worth of scan data R21, R22 to the back of data P23 of the third page of the copy file 82 without executing the color adjustment process on the two pages worth of scan data R21, R22. Furthermore, the creating unit 32 creates a new electronic signature 402 based on the three pages worth of data P21 to P23 and the two pages worth of scan data R21, R22 (S38 of FIG. 2). As a result, a new file 84 that includes the three pages worth of data P21 to P23, the two pages worth of scan data R21, R22, the first color profile 300, and the new electronic signature 402 is created.

(Specific Example where Final Page is Deleted: FIG. 11)

FIG. 11 shows an example in which the user instructs to delete the final page (YES in S108 of FIG. 7). In the example shown in FIG. 11 as well, the first color profile 300 is identical to the second color profile 302. Also, a specific file 90 does not include an electronic signature.

The user instructs to delete the third page (the final page) of the specific file 90 (YES in S108 of FIG. 7). Therefore, the creating unit 32 deletes data P33 of the third page of the specific file 90. The creating unit 32 then adds two pages worth of scan data R31, R32 to the back of data P32 of the second page. As a result, a new file 92 that includes the two pages worth of data P31, P32, the two pages worth of scan data R31, R32 and the first color profile 300 is created.

Effects of the Present Embodiment

The above has described in detail the communication system 2 according to the present embodiment. The multi-function device 10 creates the new files 62, 72, 84 that include the M+N pages worth of data by using the M pages worth of data and the N pages worth of scan data that are included in the specific files 60, 70, 80 (see FIGS. 8 to 10). Thus, when a new file is output (displayed, printed, etc.), the user can see M+N images expressed by the M+N pages worth of data. That is, the multi-function device 10 of the present embodiment can respond to the user's wish to add the new scan data, obtained through scanning, to the data included in the existing file.

(Correspondence Relationship)

The controller 24 of the multi-function device 10 is an example of "a control device." The USB memory 50 and the USB interface 22 are examples of "a specific memory" and "a memory connecting unit." Each of the files that does not include the text data for display ("AAA.pdf," "GGG.pdf," "BBB.pdf" shown in FIG. 4) is an example of "a first type of file." Each of the files including the text data for display ("CCC.pdf" and "FFF.pdf" shown in FIG. 4) is an example of "a second type of file." The color adjustment table 200 shown in FIG. 5 is an example of "adjustment data." A case in which the result of S76 of FIG. 5 is NO and a case in which the result of S76 of FIG. 5 is YES are examples of "a first case" and "a second case." A display content of the display unit 14 shown on the right-hand side of FIG. 4 is an example of "a selection screen."

Second Embodiment

In a second embodiment, when it is determined in S80 of the analysis process shown in FIG. 5 that the specific file includes the electronic signature (YES in S80), the creating unit 32 skips the processes subsequent to S82 of FIG. 5 as shown by a dashed line, as well as the processes subsequent to S22 of FIG. 2, ends the multi-function device process (FIG. 2). That is, in this embodiment, when the specific file includes the electronic signature, the creating unit 32 does not cause the scan executing unit 18 to scan the N pages worth of original to create the new file. Therefore, the specific file that includes the electronic signature is maintained without any change. Therefore, the data important to the user are maintained without any change. Furthermore, creation of excessive files that include the contents of the specific file can be prevented.

Third Embodiment

In a third embodiment, by allowing the CPU 126 of the PC 110 to execute processes in accordance with the scanner driver of the memory 128, the functions of the units 130 to 134 can be realized, as shown by the dashed lines in FIG. 1. The functions of the units 130 to 134 of the PC 110 are same as those of the units 30 to 34 of the multi-function device 10. Therefore, in the third embodiment, the controller 124 of the PC 110 controls the multi-function device 10, in place of the controller 24 of the multi-function device 10.

The user sets the original in the multi-function device 10 and then inserts the USB memory 50 into the USB interface 122 of the PC 110. In this case, the detecting unit 134 detects that the USB memory 50 is connected to the USB interface 122. In this case, the controller 124 of the PC 110 begins a process similar to that of FIG. 2.

In this embodiment, in S10 of FIG. 2, the selection allowing unit 130 causes the display unit 116 of the PC 110 to display a selection screen. The user can operate the operating unit 114 of the PC 110 and select a specific file. In addition, in S28 shown in FIG. 2, a creating unit 132 instructs the multi-function device 10 to execute scanning. As a result, the multi-function device 10 creates scan data and transmits the scan data to the PC 110. The creating unit 132 executes the processes of S32 and S33 shown in FIG. 2 by using the scan data received from the multi-function device 10.

In this embodiment, the multi-function device 10 and the PC 110 are examples of "a scan executing unit" and "a control device." Furthermore, the USB interface 122 of the PC 110 is an example of "a memory connecting unit."

Fourth Embodiment

A fourth embodiment is described with reference to FIG. 12. In the first embodiment as shown in FIG. 11, the creating unit 32 deletes the data P33 of the final page included in the specific file 90 and creates the new file 92. Instead, an example shown in FIG. 12 may be adopted. Note that, in the example shown in FIG. 12 as well, the first color profile 300 is identical to the second color profile 302, and a specific file 94 does not include an electronic signature.

Of two pages worth of data R41, R42 created as a result of the scanning, the creating unit 32 adds, not the data R41 of the first page, but the data R42 of the second page, to the specific file 94. As a result, a new file 96 that includes three pages worth of data P41 to P43, the 1 page worth of scan data R41, and the first color profile 300 is created. In this embodiment as well, the new file can be prevented from including two pages worth of data, the two pages being the same pages.

Modifications of the above-described embodiments are as follows.

(1) In the foregoing embodiments, when the specific file includes an electronic signature, the creating unit 32 adds data to the copy file but does not add data to the specific file to be copied. Instead, when the specific file includes an electronic signature, the creating unit 32 may add data to the specific file to be copied but not to the copy file. Generally, when the specific file includes the electronic signature, the creating unit may create the first file based on either the copy file obtained by copying the specific file, or the specific file.

(2) In S16 shown in FIG. 2, the selection allowing unit 30 may cause the display unit 14 to display the selection screen that shows both the file on which the additional scanning is enabled and the file on which the additional scanning is disabled. In this case, the selection screen may be configured in such a manner as to not allow the user to select the file on which the additional scanning is disabled (e.g., the file on which the additional scanning is disabled may be grayed out). This modification also is included in the configuration where "prohibit the user to select an other file."

(3) In the foregoing embodiments, a file without the text data for display is displayed above a file including the text data for display, as shown in FIG. 4. Instead, the selection allowing unit 30 may use another display method, as long as the file with the text data for display (referred to as "a first type of file" hereinafter) can be distinguished from the file without the text data for display (referred to as "a second type of file" hereinafter). Therefore, for example, the fonts, the thicknesses of the characters, the colors and the like may be made different between the first type of file and the second type of file. Furthermore, for example, a mark may be placed on the file name of either the first type of file or the second type of file. Moreover, the file name of the first type of file may not be displayed.

(4) In the foregoing embodiments, the selection allowing unit 30 displays the file without the text data for display above the file with the text data for display, as shown in FIG. 4. Instead, the selection allowing unit 30 may cause the display unit 14 to display each of the files in a manner that a file that does not include text data for search, which is used for searching a text, is displayed above a file that includes the text data for search. Generally, when the plurality of files include a third type of file that includes the text data for search and a fourth type of file that does not include the text data for search, the selection allowing unit may cause the display unit to display the third type of file and the fourth type of file separately and allow the user to select a specific file.

More generally, when a plurality of files include a file that includes text data (text data for display or text data for search) and a file that does not include the text data, the selection allowing unit may cause the display unit to display the former file and the latter file separately and allow the user to select a specific file. In addition, the selection allowing unit may cause the display unit to display, separately, the file that does not include the text data for display, the file that includes the text data for search, the file that includes the text data for display, and other files, and allows the user to select the specific file.

(5) In addition, in the foregoing embodiments, the selection allowing unit 30 allows the user to select the specific file from among the plurality of files stored in the USB memory 50, the files being the files on which the additional scanning is enabled. Instead, the selection allowing unit 30 may allow the user to select a specific file from among, for example, a plurality of files on which the additional scanning is enabled, the files being stored in a specific server within the LAN 4 or another recording medium such as a hard disk drive, not shown, of the multifunction device 10 or the PC 110. In this modification, the recording medium such as the specific server is an example of "a specific memory." In this case, the multi-function device process is started based on the fact that the scan type is selected by the operation by the user. At this moment, when the user selects the additional scanning, the selection allowing unit 30 causes the display unit 14 to display the files stored in the recording media such as the specific server and the hard disk drive, as in the embodiments described above.

(6) In the foregoing embodiment, the selection allowing unit 30, the creating unit 32, and the detecting unit 34 are realized as a result of the controller 24 performing the processes according to the program in a memory 28. Nevertheless, at least one unit of respective units 30 to 34 may alternately be realized by a hardware resource such as a logic circuit.

What is claimed is:

1. A control device for controlling a scan executing unit that scans an original, the control device comprising:
   one or more processors; and
   a memory that stores a computer program including instructions executed by the one or more processors,
   wherein the instructions cause the one or more processors, when executed by the one or more processors, to function as:
      a selection allowing unit configured to allow a user to select a specific file among a plurality of files, each of the plurality of files having a file format that is capable of including a plurality of pages worth of data, the specific file including M pages worth of data (M being an integer equal to 1 or more); and
      a creating unit configured to create a first file including M+N pages worth of data by using N pages worth of scan data (N being an integer equal to 1 or more) created by making the scan executing unit execute scanning of the N pages worth of original and the M pages worth of data included in the specific file, the first file having a same file format as the specific file, and
   wherein the creating unit is further configured to:
      create the first file based on either a copy file obtained by copying the specific file or the specific file in a case where the specific file includes an electronic signature, and
      create the first file based on the specific file without copying the specific file in a case where the specific file does not include the electronic signature.

2. The control device as in claim 1, wherein the selection allowing unit is configured to:
   allow the user to select the specific file among the plurality of files stored in a specific memory; and prohibit the user from selecting an other file stored in the specific memory, the other file having a file format that is not capable of including a plurality of pages worth of data.

3. The control device as in claim 1, wherein
in a case where the plurality of files includes a first type of file including text data used for displaying text and a second type of file not including the text data, the selection allowing unit is configured to allow the user to select the specific file by displaying the first type of file and the second type of file on a display unit distinctly.

4. The control device as in claim 1, wherein
in a first case where a first color profile included in the specific file is not identical to a second color profile suitable for a color property of the scan executing unit, the creating unit is configured to adjust the N pages worth of scan data by using adjustment data so as to create N pages worth of adjusted data, the adjustment data being obtained by using the first color profile and the second color profile,
in a second case where the first color profile is identical to the second color profile, the creating unit is configured not to adjust the N pages worth of scan data by using the adjustment data,
in the first case, the M+N pages worth of data includes the M pages worth of data and the N pages worth of adjusted data, and
in the second case, the M+N pages worth of includes the M pages worth of data and the N pages worth of scan data.

5. The control device as in claim 1, wherein
in the case where the specific file includes the electronic signature, the creating unit is configured to further create a new electronic signature that is not identical with the electronic signature by using the M+N pages worth of data, and create the first file including the M+N pages worth of data and the new electronic signature.

6. The control device as in claim 1, further comprising:
a detecting unit configured to detect that a specific memory storing the plurality of files is connected with a memory connecting unit,
when the detecting unit detects that the specific memory is connected with the memory connecting unit, the selection allowing unit is configured to make a display unit display a selection screen for allowing the user to select the specific file among the plurality of files.

7. The control device as in claim 1, wherein
the selection allowing unit is configured to further allow the user to select whether M-th page data included in the specific file should be deleted or not, and
the creating unit is configured to:
create a second file including M+N−1 pages worth of data by using M−1 pages worth of data obtained by deleting the M-th page data from the specific file and the N pages worth of scan data in a case where the user selected that the M-th page data should be deleted, the second file having a same file format as the specific file; and
create the first file in a case where the user selected that the M-th page data should not be deleted.

8. A control device for controlling a scan executing unit that scans an original, the control device comprising:
one or more processors; and
a memory that stores a computer program including instructions executed by the one or more processors,
wherein the instructions cause the one or more processors, when executed by the one or more processors, to function as:

a selection allowing unit configured to allow a user to select a specific file among a plurality of files, each of the plurality of files having a file format that is capable of including a plurality of pages worth of data, the specific file including M pages worth of data (M being an integer equal to 1 or more); and
a creating unit configured to:
create, in a case where the specific file does not include an electronic signature, a first file including M+N pages worth of data by using N pages worth of scan data (N being an integer equal to 1 or more) created by making the scan executing unit execute scanning of the N pages worth of original and the M pages worth of data included in the specific file, the first file having a same file format as the specific file, and not to make the scan executing unit execute scanning of the N pages worth of original in a case where the specific file includes the electronic signature,
wherein the first file is created based on either a copy file obtained by copying the specific file or the specific file in the case where the specific file includes the electronic signature, and
wherein the first file is created based on the specific file without copying the specific file in the case where the specific file does not include the electronic signature.

9. A non-transitory computer-readable storage medium storing a computer program for a control device configured to control a scan executing unit that scans an original,
the computer program including instructions for causing one or more processors of the control device to perform:
allowing a user to select a specific file among a plurality of files, each of the plurality of files having a file format that is capable of including a plurality of pages worth of data, the specific file including M pages worth of data (M being an integer equal to 1 or more); and
creating a first file including M+N pages worth of data by using N pages worth of scan data (N being an integer equal to 1 or more) created by making the scan executing unit execute scanning of the N pages worth of original and the M pages worth of data included in the specific file, the first file having a same file format as the specific file,
wherein the first file is created based on either a copy file obtained by copying the specific file or the specific file in a case where the specific file includes an electronic signature, and
wherein the first file is created based on the specific file without copying the specific file in a case where the specific file does not include the electronic signature.

10. A control device for controlling a scan executing unit that scans an original, the control device comprising:
one or more processors; and
a memory that stores a computer program including instructions executed by the one or more processors,
wherein the instructions cause the one or more processors, when executed by the one or more processors, to function as:
a selection allowing unit configured to:
allow a user to select a specific file among a plurality of files, each of the plurality of files having a file format that is capable of including a plurality of pages worth of data, the specific file including M pages worth of data (M being an integer equal to 1 or more), and
allow the user to select whether M-th page data included in the specific file should be deleted or not; and a creating unit configured to:

create, in a case where the user selected that the M-th page data should not be deleted, a first file including M+N pages worth of data by using N pages worth of scan data (N being an integer equal to 1 or more) created by making the scan executing unit execute scanning of the N pages worth of original and the M pages worth of data included in the specific file, the first file having a same file format as the specific file, and create, in a case where the user selected that the M-th page data should be deleted, a second file including M+N−1 pages worth of data by using M−1 pages worth of data obtained by deleting the M-th page data from the specific file and the N pages worth of scan data, the second file having a same file format as the specific file, wherein the file created by the creating unit is created based on either a copy file obtained by copying the specific file or the specific file in a case where the specific file includes an electronic signature, and wherein the file created by the creating unit is created based on the specific file without copying the specific file in a case where the specific file does not include the electronic signature.

\* \* \* \* \*